(12) United States Patent
Yoshizawa

(10) Patent No.: US 7,405,758 B2
(45) Date of Patent: Jul. 29, 2008

(54) IMAGE PICKUP DEVICE AND DRIVING METHOD THEREFOR

(75) Inventor: Motoki Yoshizawa, Tuas (SG)

(73) Assignee: Seiko Epson Corporation, Tokyo (JP)

( * ) Notice: Subject to any disclaimer, the term of this patent is extended or adjusted under 35 U.S.C. 154(b) by 759 days.

(21) Appl. No.: 10/853,517

(22) Filed: May 24, 2004

(65) Prior Publication Data

US 2005/0012841 A1 Jan. 20, 2005

(30) Foreign Application Priority Data

May 26, 2003 (JP) ............ P.2003-147901

(51) Int. Cl.
*H04N 3/14* (2006.01)
*H04N 5/335* (2006.01)

(52) U.S. Cl. .................. 348/311; 348/315; 348/316

(58) Field of Classification Search ............ 348/311, 348/315, 316, 296
See application file for complete search history.

(56) References Cited

U.S. PATENT DOCUMENTS 6,473,125 B1 * 10/2002 Kuno ............ 348/296
6,924,840 B1 * 8/2005 Furuhata ............ 348/264
7,196,303 B2 * 3/2007 Tsunai ............ 250/208.1
2002/0134915 A1 9/2002 Chen
2004/0142214 A1 * 7/2004 Priore et al. ............ 429/12

FOREIGN PATENT DOCUMENTS

| JP | 2001-157119 | 6/2001 |
| JP | 2001244448 | 9/2001 |
| JP | 2003-110803 | 4/2003 |

OTHER PUBLICATIONS

European Search Report dated Nov. 11, 2005.

\* cited by examiner

*Primary Examiner*—Lin Ye
*Assistant Examiner*—Gevell Selby
(74) *Attorney, Agent, or Firm*—John J. Penny, Jr.; Edwards Angell Palmer & Dodge LLP

(57) ABSTRACT

In addition to transfer units for transferring electric charges generated from photo receiving units for every cell, a high-speed transfer unit is provided which transfers electric charges generated from the photo receiving units collectively on a unit basis of plural cells, whereby a reading speed can be made higher without making the operation speed of a driving circuit higher. To be more concrete, the number of shift cycles necessary for transferring from the transfer unit electric charges generated from the photo receiving units during the open time period of a shutter or electric charges generated from the photo receiving units during a time period except for the open time period of the shutter can be reduced.

4 Claims, 7 Drawing Sheets

FIG. 4

EMBODIMENT

| dpi | CONTROL ROG | CCD DRIVING | φ1,2 (MHz) | φ3,4 (MHz) | TIME FOR READING ONE LINE | READING DOCUMENT OF A4 SIZE |
|---|---|---|---|---|---|---|
| 4800 | ROG_HM/HS | AT EVERY CELL OF MAIN TRANSFER UNIT AND SUB-TRANSFER UNIT | 1.5 | 3 | 13.6 | |
| 2400 | ROG_HM/HS | AT EVERY CELL OF MAIN TRANSFER UNIT | 3 | 3 | 6.80 | |
| 1200 | ROG_HM/HS | AT EVERY TWO CELLS OF MAIN TRANSFER UNIT | 6 | 3 | 3.40 | 48 |
| 800 | ROG_HM/HS | AT EVERY THREE CELLS OF MAIN TRANSFER UNIT | 6 | 2 | 3.40 | 32 |
| 600 | ROG_LM/LS | AT EVERY CELL OF HIGH-SPEED TRANSFER UNIT | 3 | 3 | 1.70 | 12 |
| 300 | ROG_LM/LS | AT EVERY TWO CELLS OF HIGH-SPEED TRANSFER UNIT | 6 | 3 | 0.85 | 3 |

FIG. 5

COMPARATIVE EXAMPLE 1

| dpi | CONTROL ROG | CCD DRIVING | φ1,2 (MHz) | φ3,4 (MHz) | TIME FOR READING ONE LINE | READING DOCUMENT OF A4 SIZE |
|---|---|---|---|---|---|---|
| 4800 | ROG_HM/HS | AT EVERY CELL OF MAIN TRANSFER UNIT AND SUB-TRANSFER UNIT | 1.5 | 3 | 13.6 | |
| 2400 | ROG_HM/HS | AT EVERY CELL OF MAIN TRANSFER UNIT | 3 | 3 | 6.80 | |
| 1200 | ROG_HM/HS | AT EVERY TWO CELLS OF MAIN TRANSFER UNIT | 6 | 3 | 3.40 | 48 |
| 800 | ROG_HM/HS | AT EVERY THREE CELLS OF MAIN TRANSFER UNIT | 6 | 2 | 3.40 | 32 |
| 600 | ROG_LM/LS | AT EVERY FOUR CELLS OF MAIN TRANSFER UNIT | 6 | 1.5 | 3.40 | 24 |
| 300 | ROG_LM/LS | AT EVERY EIGHT CELLS OF MAIN TRANSFER UNIT | 6 | 1.5 | 3.40 | 12 |

FIG. 6

COMPARATIVE EXAMPLE 2

| dpi | CONTROL ROG | CCD DRIVING | φ1,2 (MHz) | φ3,4 (MHz) | TIME FOR READING ONE LINE | READING DOCUMENT OF A4 SIZE |
|---|---|---|---|---|---|---|
| 4800 | ROG_HM/HS | AT EVERY CELL OF MAIN TRANSFER UNIT AND SUB-TRANSFER UNIT | 1.5 | 3 | 13.6 | |
| 2400 | ROG_HM/HS | AT EVERY CELL OF MAIN TRANSFER UNIT | 3 | 3 | 6.80 | |
| 1200 | ROG_HM/HS | AT EVERY TWO CELLS OF MAIN TRANSFER UNIT | 6 | 3 | 3.40 | 48 |
| 800 | ROG_HM/HS | AT EVERY THREE CELLS OF MAIN TRANSFER UNIT | 6 | 2 | 3.40 | 32 |
| 600 | ROG_LM/LS | AT EVERY FOUR CELLS OF MAIN TRANSFER UNIT | 8 | 2 | 2.55 | 24 |
| 300 | ROG_LM/LS | AT EVERY EIGHT CELLS OF MAIN TRANSFER UNIT | 8 | 2 | 2.55 | 12 |

IMAGE PICKUP DEVICE AND DRIVING METHOD THEREFOR

BACKGROUND OF THE INVENTION

The present invention relates to an image pickup device and a method for driving the image pickup device.

Conventionally, image pickup devices such as CCD image sensors have been widely used for image scanners, facsimiles, digital cameras etc. JP-A-2001-157119 discloses an image pickup device in which a plurality of photo receiving units are arranged in parallel and each of the photo receiving units is configured in a manner that cells each for generating electric charges through photoelectric conversion are arranged in series.

An object of reading a document by lowering the resolution in the main scanning direction is to read the document at a high speed. Thus, it is required to make the frequency of shift pulses applied to a transfer unit higher as the resolution is made lower. However, there is a problem that the maximum frequency of the shift pulses is limited and, in general, a manufacturing cost increases when mounting a driving circuit for applying the shift pulses of a high frequency to the transfer unit. Further, in general, when the frequency of the shift pulses is determined, the frequency of output gate pulses is also determined in accordance with the determined frequency of the shift pulses. Thus, when the frequency of the shift pulses can not be made higher, the reading speed at a low resolution can not be made higher.

SUMMARY OF THE INVENTION

The invention has been made in order to solve such a conventional problem and an object of the invention is to provide an image pickup device and a method for driving the image pickup device, which can make a reading speed higher without making the operation speed of a driving circuit higher.

In order to attain the aforesaid object, the image pickup device according to the invention is arranged in a manner that the image pickup device including a photo receiving unit in which a plurality of cells each generating electric charges through photoelectric conversion are arranged in series, the image pickup device is characterized by comprising:

a first transfer unit which is provided in parallel to the photo receiving unit and transfers electric charges generated by the photo receiving unit for each of the plurality of cells;

a first gate which is provided between the photo receiving unit and the first transfer unit and transfers electric charges generated by the photo receiving unit to the first transfer unit;

a second transfer unit which is provided in parallel to the photo receiving unit and transfers electric charges generated by the photo receiving unit for plural cells of the plurality of cells;

a second gate which is provided between the photo receiving unit and the second transfer unit and transfers electric charges generated by the photo receiving unit to the second transfer unit; and a detection unit which detects electric charges transferred by the first transfer unit.

In addition to the transfer unit for transferring electric charges generated from the photo receiving unit for every cell, the other transfer unit is provided which transfers electric charges generated from the photo receiving unit collectively on a unit basis of plural cells, whereby a reading speed can be made higher without making the operation speed of a driving circuit higher. To be more concrete, the number of shift cycles necessary for transferring from the transfer unit electric charges (pixel electric charges) generated from the photo receiving unit during the open time period of a shutter or electric charges (unnecessary electric charges) generated from the photo receiving unit during a time period except for the open time period of the shutter can be reduced.

Further, the image pickup device according to the invention is characterized in that the detection unit detects electric charges transferred by the first and second transfer units. Since the electric charges transferred by the first and second transfer units are detected, a reading speed in the reading mode with a low resolution can be made higher without making the operation speed of the driving circuit higher. To be more concrete, when pixel the electric charges generated by the photo receiving unit within the open time period of the shutter are transferred to an output unit by the second transfer unit in the reading mode with the low resolution, the number of the shift cycles necessary for detecting the electric charges can be reduced.

Further, the image pickup device according to the invention is characterized in that two of the photo receiving unit are arranged in a manner that the plurality of cells of one of the two photo receiving units are deviated by a half pitch in an arrangement direction from the plurality of cells of the other of the two photo receiving units, the two photo receiving units are disposed in parallel to each other and are provided for each color, two of the first transfer unit are disposed on both outer sides of the two photo receiving units, respectively, and are provided for each color, two of the first gate are provided in a manner that one of the two first gates is disposed between corresponding one of the two photo receiving units and corresponding one of the two first transfer units and the other of the two first gates is disposed between corresponding the other of the two photo receiving units and corresponding the other of the two first transfer units, two of the second transfer unit are disposed on both inner sides of the two photo receiving units, respectively, and are provided for each color, and two of the second gate are provided in a manner that one of the two second gates is disposed between corresponding one of the two photo receiving units and corresponding one of the two second transfer units and the other of the two second gates is disposed between corresponding the other of the two photo receiving units and corresponding the other of the two second transfer units.

Since electric charges accumulated in the two photo receiving units provided for each color are joined in the transfer unit and electric charges accumulated in the plural cells of each of the two photo receiving units are collectively transferred, a reading speed can be made higher without making the operation speed of the driving circuit higher. Further, since the plurality of cells of one of the two photo receiving units are deviated by the half pitch in the arrangement direction from the plurality of cells of the other of the two photo receiving units, the resolution in the main scanning line direction can be doubled without causing such a matter that each of the cells are made small thereby to degrade the sensitivity thereof.

In order to attain the aforesaid object, the method of driving the image pickup device according to the invention is characterized by comprising steps of:

transferring, from the first transfer unit, electric charges accumulated in the photo receiving unit during an open time period of a shutter and detecting the electric charges thus transferred by the detection unit; and ejecting, from the second transfer unit, electric charges accumulated in the photo receiving unit during a time period other than the open time period of the shutter.

Since the second transfer unit ejects electric charges (unnecessary electric charges) accumulated in the photo receiving unit during the time period other than the open time period of the shutter, the number of the shift cycles necessary for transferring the unnecessary electric charges from the transfer unit can be reduced. Further, since the first transfer unit transfers pixel electric charges, the transfer of electric charges (pixel electric charges) accumulated within the open time period of the shutter can be started without waiting until the transfer of the unnecessary electric charges is terminated.

Further, the method of driving the image pickup device according to the invention is characterized by comprising steps of:

in a reading mode with a high resolution, transferring, from the first transfer unit, electric charges accumulated in the photo receiving unit during an open time period of a shutter and detecting the electric charges thus transferred by the detection unit; and in the reading mode with the low resolution, transferring, from the second transfer unit, electric charges accumulated in the photo receiving unit during the open time period of the shutter and detecting the electric charges thus transferred from the second transfer unit by the detection unit.

Since pixel electric charges are transferred by the second transfer unit in the reading mode with the low resolution, a reading speed in the reading mode with the low resolution can be made higher without making the operation speed of the driving circuit higher. To be more concrete, in the reading mode with the low resolution, the number of the shift cycles necessary for detecting pixel electric charges can be reduced.

Further, the method of driving the image pickup device according to the invention is characterized by comprising steps of:

in the reading mode with the high resolution, transferring, from the two first transfer units in parallel, electric charges accumulated in the two photo receiving units during an open time period of a shutter; and in the reading mode with the low resolution, joining, at the second transfer unit, electric charges accumulated in the two photo receiving units during the open time period of the shutter and transferring the electric charges thus joined.

Since pixel electric charges accumulated in the two photo receiving units are joined and transferred by the second transfer unit in the reading mode with the low resolution, a reading speed can be made higher without making the operation speed of the driving circuit higher.

Further, the method of driving the image pickup device according to the invention is characterized by comprising steps of:

after opening the second gate, closing the first and second gates thereby to open the shutter; and after opening the shutter, opening the first gate thereby to close the shutter.

Since the shutter function is realized by the opening and closing operations of the two gates, the shutter can be controlled easily.

BRIEF DESCRIPTION OF THE DRAWINGS

FIG. 4 is a table showing driving pulses etc. according to the embodiment of the invention.

FIG. 5 is a table showing driving pulses etc. according to a comparative example 1.

FIG. 6 is a table showing driving pulses etc. according to a comparative example 2.

DETAILED DESCRIPTION OF PREFERRED EMBODIMENTS

The embodiment of the invention will be explained hereinafter.

Figure 1:
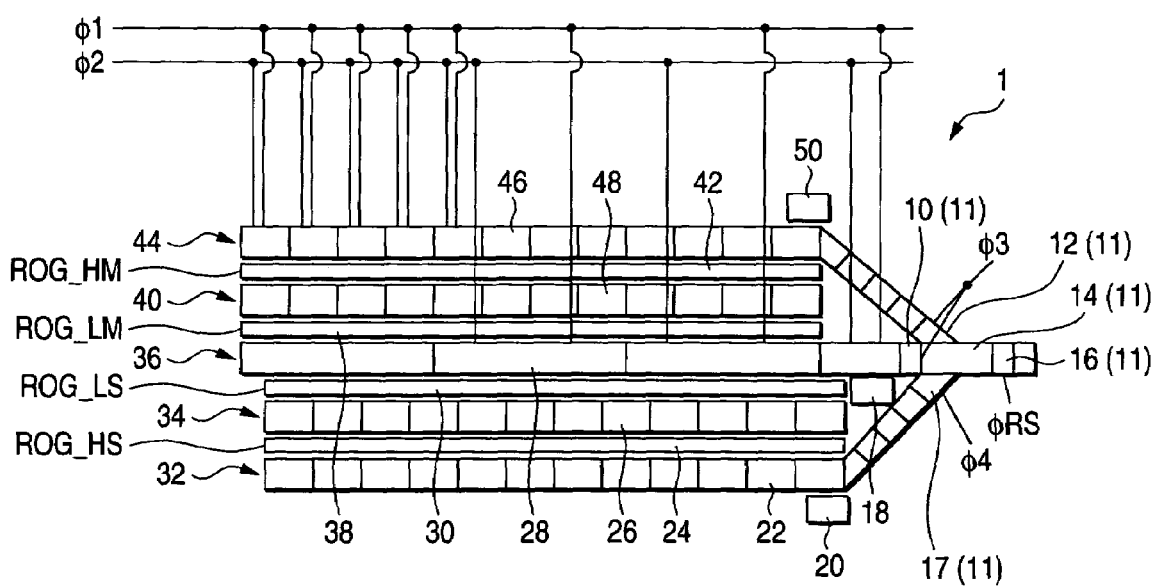
FIG. 1 is a schematic diagram showing an image sensor according to the embodiment of the invention.

FIG. 1 is a schematic diagram showing the configuration of an image sensor 1 according to the embodiment of the invention. The image sensor 1 as an image pickup device is a CCD linear image sensor of a color output system which is arranged in a manner that a plurality of photo receiving units 34 and a plurality of photo receiving units 40 are disposed in parallel on the same chip and filters of predetermined colors are formed on the photo receiving units 34, 40 in an on-chip manner. Constituent elements for reading concentration information is same in each color except for the filters. Thus, FIG. 1 shows only the constituent elements for reading the concentration information of one color and the constituent elements for reading the concentration information of the remaining two colors are omitted. As the filters, in addition to three filters for primary colors R (red), G (green) and B (blue), filters for three complementary colors C (cyan), M (magenta), Y (yellow) or four complementary colors C, M, Y, G (green) are used. Further, the invention is applicable not only to an image pickup device of full colors but also to an image pickup device of monochrome.

The image sensor 1 includes a main photo receiving unit 40 as a first photo receiving unit, a sub-photo receiving unit 34 as a second photo receiving unit, a first main gate 42 and a first sub-gate 24 as a first gate, a main transfer unit 44 and a sub-transfer unit 32 as a first transfer unit, a second main gate 38 and a second sub-gate 30 as a second gate, a high-speed transfer unit 36 as a second transfer unit, and a detection unit 11 etc.

Two rows of the photo receiving units are provided for each color. The main photo receiving unit 40 and the sub-photo receiving unit 34 each provided with the filter of the same color are arranged in a manner that cells 48 of the main photo receiving unit described later are disposed so as to be deviated from cells 26 of the sub-photo receiving unit described later by a half pitch in the arrangement direction thereof.

Signals relating to an n-th main scanning line among signals outputted from the two photo receiving units 34, 40 respectively provided with the filters of the same color are processed to obtain pixels, and the pixels thus obtained are arranged alternatively thereby to generate image data of one line corresponding to this main scanning line. In the two photo receiving units 40, 34 provided with the filters of the same color, the cells 48 of the main photo receiving unit 40 are disposed so as to be deviated from the cells 26 of the sub-photo receiving unit 34 by a half pitch in the arrangement direction thereof, whereby the resolution in the main scanning line direction can be substantially doubled without causing such a matter that each of the cells are made small thereby to degrade the sensitivity thereof.

The main photo receiving unit 40 includes a plurality of the cells 48 arranged in series. The sub-photo receiving unit 34 includes a plurality of the cells 26 arranged in series. The respective cells 48 of the main photo receiving unit 40 are arranged with the same pitch as the respective cells 26 of the sub-photo receiving unit 34. As described above, each of the cells 48 of the main photo receiving unit 40 is disposed so as to be deviated from corresponding one of the cells 26 of the sub-photo receiving unit 34 by a half pitch in the arrangement direction thereof. Each of the cells 48, 26 is a photoelectric conversion element such as a photo diode which receives light transmitted through the filter and generates electric charge correlated to the received light quantity through the photoelectric conversion.

A main transfer unit 44 is provided in relation to the main photo receiving unit 40. A sub-transfer unit 32 is provided in relation to the sub-photo receiving unit 34. Each of the main transfer unit 44 and the sub-transfer unit 32 is constituted by a CCD analog shift register and is provided with two kinds of electrodes which are arranged alternatively in the longitudinal direction and to which shift pulses φ1 and φ2 are applied, respectively. When the shift pulse φ1 or φ2 is applied to each of the cells, a potential well for confining electric charge is formed at the each cell. The pitch of the cells 46 of the main transfer unit 44 is same as that of the cells 48 of the main photo receiving unit 40. Thus, electric charges accumulated in each cell of the main photo receiving unit 40 are confined in the potential well formed at the corresponding one of the cells of the main transfer unit 44. Although two-phase pulses are used as the shift pulses for the main transfer unit 44, pulses of three or more phases may be used instead of the two-phase pulses.

A first main gate 42 is provided between the main photo receiving unit 40 and the main transfer unit 44. The first main gate 42 is provided with an electrode to which a first main gate pulse ROG_HM is applied.

A first sub-gate 24 is provided between the sub-photo receiving unit 34 and the sub-transfer unit 32. The first sub-gate 24 is provided with an electrode to which a second sub-gate pulse ROG_HS is applied.

The high-speed transfer unit 36 is provided between the main photo receiving unit 40 and the sub-photo receiving unit 34. The high-speed transfer unit 36 is constituted by a CCD analog shift register and is provided with two kinds of electrodes which are arranged alternatively in the longitudinal direction and to which the shift pulses φ1 and φ2 are applied, respectively. When the shift pulse φ1 or φ2 is applied to each of the cells, a potential well for confining electric charge is formed for the each cell. The width along the transfer direction of each of the cells 28 of the high-speed transfer unit 36 is four times as large as the width along the transfer direction of each of the cells 48 of the main photo receiving unit 40 and each of the cells 26 of the sub-photo receiving unit 34. The pitch of each of the cells 28 of the high-speed transfer unit 36 is four times as large as the pitch of each of the cells 48 of the main photo receiving unit 40 and each of the cells 26 of the sub-photo receiving unit 34. Thus, the potential well formed at each of the cells of the high-speed transfer unit 36 collectively confines electric charges accumulated in eight cells in total, that is, the four cells of the main photo receiving unit 40 and the four cells of the sub-photo receiving unit 34.

A second main gate 38 is provided between the main photo receiving unit 40 and the high-speed transfer unit 36. The second main gate 38 is provided with an electrode to which a second main gate pulse ROG_LM is applied.

A second sub-gate 30 is provided between the sub-photo receiving unit 34 and the high-speed transfer unit 36. The second sub-gate 30 is provided with an electrode to which a second sub-gate pulse ROG_LS is applied.

The detection unit 11 is provided at the front end sides of the main transfer unit 44, the sub-transfer unit 32 and the high-speed transfer unit 36. The detection unit 11 includes a main output gate 12, a sub-output gate 17, a high-speed output gate 10, a floating capacitor 14, a reset gate 16 and a not-shown output circuit. The output circuit detects electric charges transferred to the floating capacitor 14 and outputs an electric signal (an image signal) corresponding to the detected electric charges. Each of the main output gate 12 and the high-speed output gate 10 is provided with an electrode to which an output gate pulse φ3 is applied. The sub-output gate 17 is provided with an electrode to which an output gate pulse φ4 is applied. The reset gate 16 is provided with an electrode to which a reset gate pulse φRS is applied.

The main transfer unit 44 is provided with a main OFD 50. In a reading mode with a low resolution for detecting electric charges transferred by the high-speed transfer unit 36, the electric charges transferred by the main transfer unit 44 are ejected from the main OFD 50. The high-speed transfer unit 36 is provided with a high-speed OFD 18. In a reading mode with a high resolution for detecting electric charges transferred by the main transfer unit 44 or the sub-transfer unit 32, electric charges transferred by the high-speed transfer unit 36 are ejected from the high-speed OFD 18. The sub-transfer unit 32 is provided with a sub-OFD 20. In a mode for detecting electric charges transferred by the main transfer unit 44 or the high-speed transfer unit 36, electric charges accumulated in the sub-photo receiving unit 34 are ejected from the sub-OFD 20. The driving circuit for the main transfer unit 44 and the driving circuit for the sub-transfer unit 32 may be provided as a separate system thereby to eliminate the main OFD 50.

Hereinafter, the driving method of the image sensor 1 will be explained supposing that the basis resolution of the image sensor is 4,800 dpi. In a mode for reading with the resolution of 4,800 dpi, the detection unit 11 alternatively detects electric charges accumulated in the main photo receiving unit 40 and electric charges accumulated in the sub-photo receiving unit 34. In this case, the output gate pulses φ3, φ4 having the twice frequency of the shift pulses φ1, φ2 are applied to the main output gate 12 and the sub-output gate 17, respectively.

(First Driving Method)

FIGS. 2 and 3 show timing charts illustrating the first driving method of the image sensor 1 in a mode for reading with a resolution lower than the basic resolution.

(1) 1,200 dpi Mode

In a mode for reading with a resolution of 1,200 dpi, electric charges generated from the respective cells 48 of the main photo receiving unit 40 are joined for every two cells and detected by the detection unit 11. Electric charges generated from the sub-photo receiving unit 34 are ejected from the sub-OFD 20.

Figure 2A:
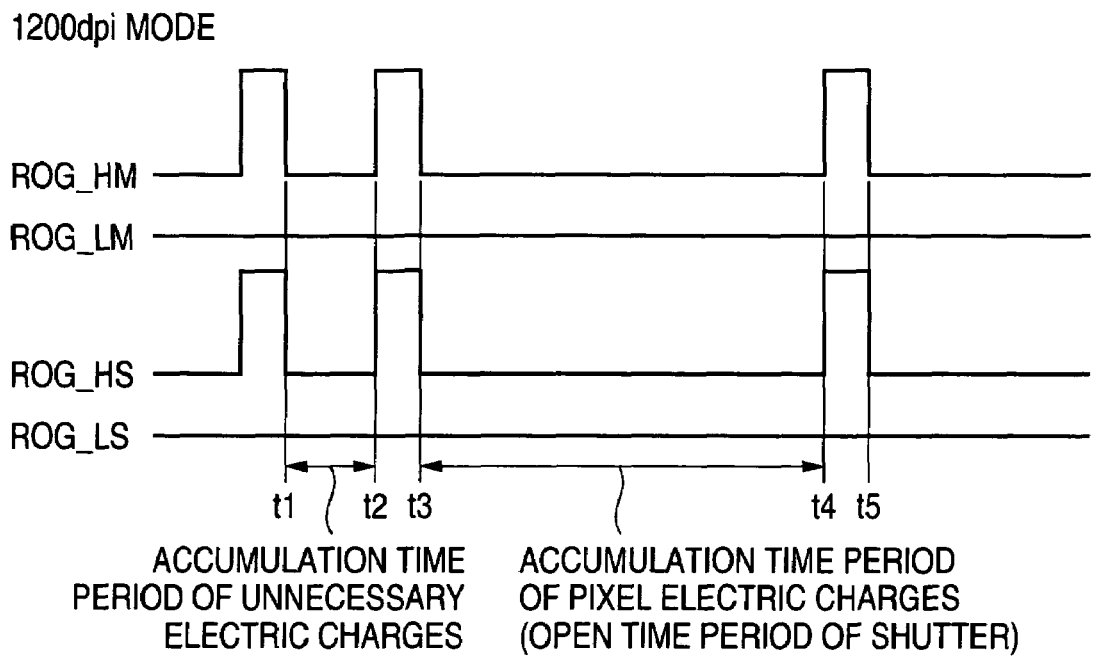
FIGS. 2A and 2B are timing charts illustrating a driving method according to the embodiment of the invention.

To be more concrete, as shown in FIG. 2(A), before accumulating pixel electric charges detected as the image signal in the main photo receiving unit 40, the ROG_HM is applied to eject unnecessary electric charges to the main transfer unit 44 (t2<t<t3). Succeedingly, the ROG_HM is made low thereby to accumulate pixel electric charges in the main photo receiving unit 40 (t3<t<t4). Succeedingly, the pixel electric charges accumulated in the main photo receiving unit 40 are transferred to the main transfer unit 44 by applying the ROG_HM (t4<t<t5). In this respect, since the high-speed transfer unit 36 is not used in the mode for reading with the resolution of 1,200 dpi, the ROG_LM is always kept to low.

Figure 3A:
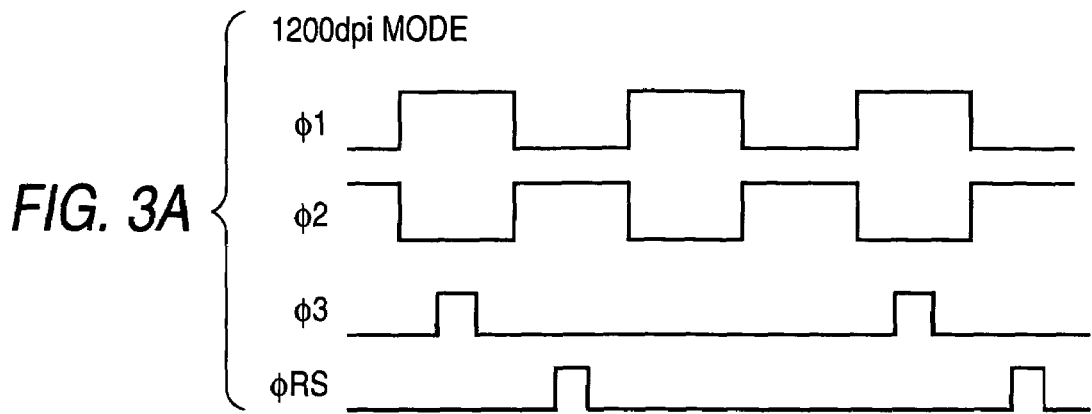
FIGS. 3A to 3C are timing charts illustrating a driving method according to the embodiment of the invention.

The electric charges transferred to the main transfer unit 44 from the main photo receiving unit 40 are further transferred to the detection unit 11 by applying the shift pulses φ1, φ2 to the main transfer unit 44. As shown in FIG. 3(A), in the detection unit 11, the pulse φ3 is applied to the main output gate 12 only every two cycles of the pulses φ1 and φ2 to open the main output gate 12, thereby joining at the floating capacitor 14 the electric charges accumulated in the two cells 48 of the main photo receiving unit 40. Succeedingly, the electric charges joined at the floating capacitor 14 are detected, and then the pulse φRS is applied to the reset gate 16 to open it thereby to eject the electric charges of the floating capacitor 14.

That is, in the mode for reading with the resolution of 1,200 dpi, the main transfer unit 44 is used which transfers electric charges separately for each cell of the main photo receiving unit 40, and the detection unit 11 joins electric charges of the two cells. Thus, the frequency of each of the pulses φ1, φ2 applied to the main transfer unit 44 is twice the frequency of each of the pulses φ3, φRS applied to the detection unit 11.

(2) 600 dpi Mode

In a mode for reading with a resolution of 600 dpi, electric charges generated from the cells of the main photo receiving unit 40 and the cells of the sub-photo receiving unit 34 are joined for every four cells of these units in total and transferred to the one cell of the high-speed transfer unit 36. The detection unit 11 detects electric charges for each cell of the high-speed transfer unit 36.

Figure 2B:
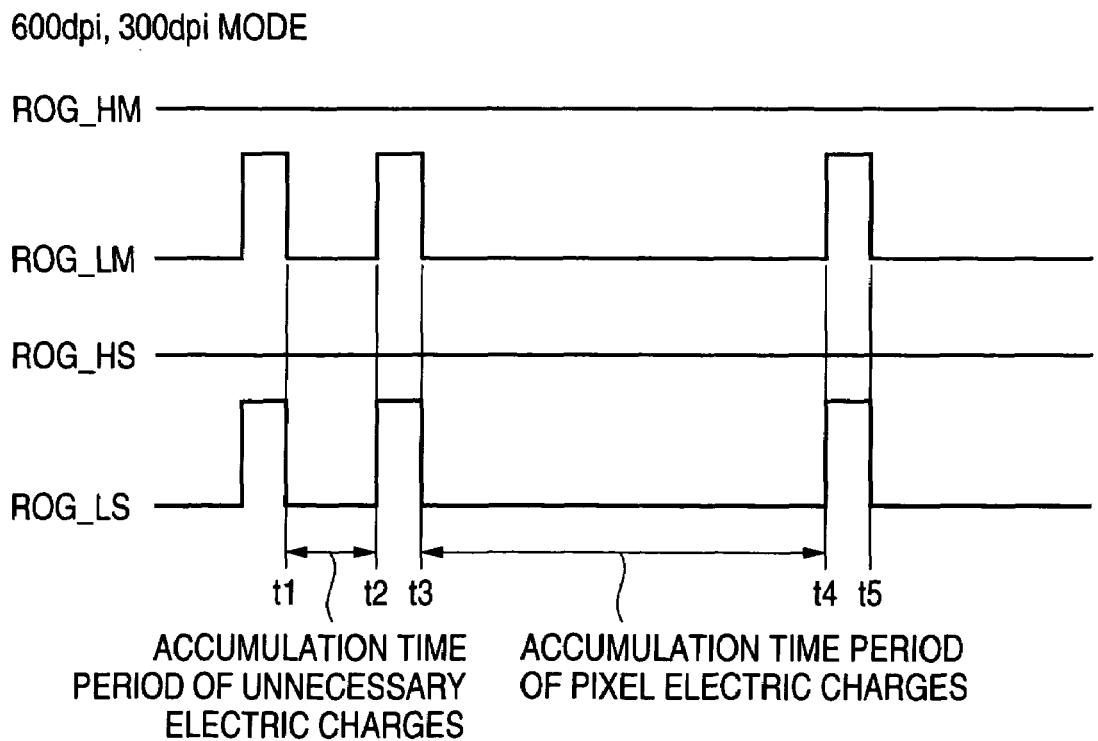

To be more concrete, as shown in FIG. 2(B), before accumulating pixel electric charges in the main photo receiving unit 40 and the sub-photo receiving unit 34, the ROG_LM and the ROG_LS are applied to eject unnecessary electric charges of the main photo receiving unit 40 and the sub-photo receiving unit 34 to the high-speed transfer unit 36 (t2<t<t3). Succeedingly, the ROG_LM and the ROG_LS are made low thereby to accumulate pixel electric charges in the main photo receiving unit 40 and the sub-photo receiving unit 34 (t3<t<t4). Succeedingly, the pixel electric charges accumulated in the main photo receiving unit 40 and the sub-photo receiving unit 34 are transferred to the high-speed transfer unit 36 by applying the ROG_LM and the ROG_LS (t4<t<t5). In this respect, since electric charges of the main photo receiving unit 40 and the sub-photo receiving unit 34 are joined and detected as pixel electric charges, an S/N can be improved to a large extent as compared with a case where only electric charges of the main photo receiving unit 40 are detected as pixel electric charges. However, since the cells 28 of the high-speed transfer unit 36 deviate by a half pitch in the arrangement direction thereof from the cells 26 of the sub-photo receiving unit 34, electric charges accumulated in the cell 26 of the sub-photo receiving unit 34 opposing to the boundary of the corresponding adjacent cells 28 of the high-speed transfer unit 36 are separated into and transferred by the corresponding adjacent two cells of the high-speed transfer unit 36. Incidentally, in the mode of reading with the resolution of 600 dpi, since both the main transfer unit 44 and the sub-transfer unit 32 are not used, both the ROG_HM and the ROG_HS are always kept low.

The pixel electric charges transferred to the high-speed transfer unit 36 from the main photo receiving unit 40 and the sub-photo receiving unit 34 are transferred to the detection unit 11 by applying the pulses φ1, φ2 to the high-speed transfer unit 36. In this case, the numbers of cycles (shift cycle numbers) of each of the pulses φ1, φ2 necessary for sending electric charges of all the cells of the high-speed transfer unit 36 to the detection unit 11 is one quarter of the numbers of cycles of each of the pulses φ1, φ2 necessary for sending electric charges of all the cells of the main transfer unit 44 to the detection unit 11

Figure 3B:
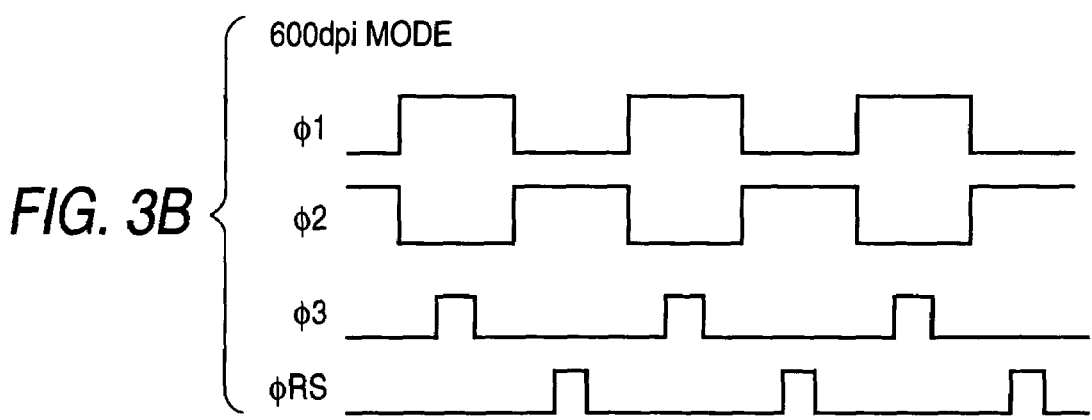

As shown in FIG. 3(B), in the detection unit 11, the pulse φ3 is applied to the high-speed output gate 10 every one cycle of the pulses φ1 and φ2 to open the high-speed output gate 10, thereby transferring the electric charges accumulated in the eight cells in total of the main photo receiving unit 40 and the sub-photo receiving unit 34 to the floating capacitor 14. Succeedingly, the electric charges transferred to the floating capacitor 14 are detected, and then the pulse φRS is applied to the reset gate 16 to open it thereby to eject the electric charges of the floating capacitor 14.

That is, in the mode for reading with the resolution of 600 dpi, since the detection unit 11 detects electric charges for each cell of the high-speed transfer unit 36, the frequency of each of the pulses φ1, φ2 applied to the high-speed transfer unit 36 is same as the frequency of each of the pulses φ3, φRS applied to the detection unit 11.

(3) 300 dpi Mode

In a mode for reading with a resolution of 300 dpi, electric charges generated from the cells of the main photo receiving unit 40 and the cells of the sub-photo receiving unit 34 are joined for every four cells of these units in total and transferred to the one cell of the high-speed transfer unit 36. Then, the detection unit 11 detects electric charges for every two cells of the high-speed transfer unit 36.

A method of transferring electric charges generated by the main photo receiving unit 40 and the sub-photo receiving unit 34 to the high-speed transfer unit 36 and further transferring from the high-speed transfer unit 36 to the detection unit 11 is same as the aforesaid method in the mode for reading with the resolution of 600 dpi, the explanation thereof will be omitted.

Figure 3C:
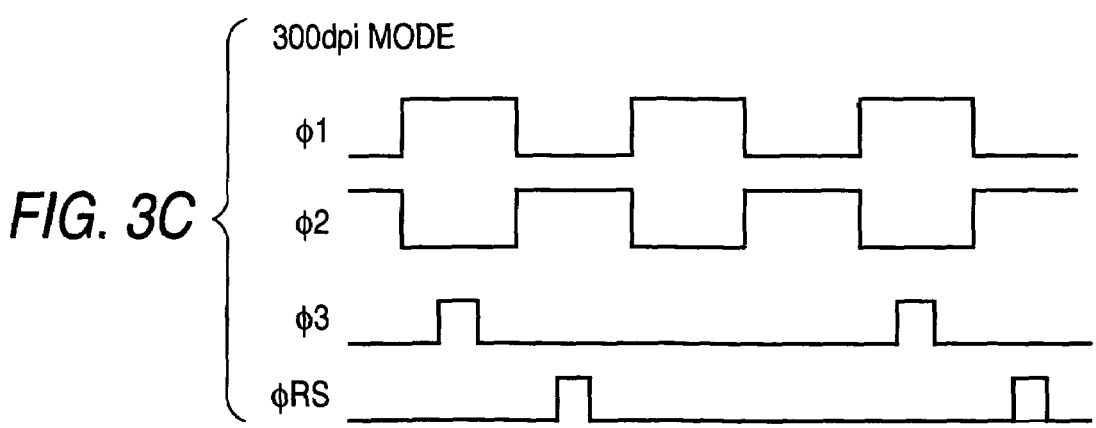

As shown in FIG. 3(C), in the detection unit 11, the pulse φ3 is applied to the high-speed output gate 10 every two cycles of the pulses φ1 and φ2 to open the high-speed output gate 10, thereby joining at the floating capacitor 14 the electric charges accumulated in the sixteen cells in total of the main photo receiving unit 40 and the sub-photo receiving unit 34. Succeedingly, the electric charges joined to the floating capacitor 14 are detected, and then the pulse φRS is applied to the reset gate 16 to open it thereby to eject the electric charges of the floating capacitor 14.

That is, in the mode for reading with the resolution of 300 dpi, since electric charges for the two cells of the high-speed transfer unit 36 are joined in the detection unit 11, the frequency of each of the pulses φ1, φ2 applied to the high-speed transfer unit 36 is twice the frequency of each of the pulses φ3, φRS applied to the detection unit 11.

FIG. 4 is a table exemplarily showing, as the embodiment according to the first driving method, frequencies etc. of the respective driving pulses to be applied to the image sensor 1 in each of the reading modes of the respective resolutions. FIG. 5 is a table exemplarily showing, as a comparative example 1, frequencies etc. of the respective driving pulses to be applied to a conventional image sensor in each of the reading modes of the respective resolutions. In each of the embodiment and the comparative example 1 according to the first driving method, the maximum frequency of the driving pulse is set to 6 MHz. In the embodiment according to the first driving method, the high-speed transfer unit 36 is used thereby to make the reading speed at the resolutions 600 dpi and 300 dpi higher without increasing the maximum frequency.

FIG. 6 is a table exemplarily showing, as a comparative example 2, frequencies etc. of the respective driving pulses to be applied to a conventional image sensor in each of the reading modes of the respective resolutions. In the comparative example 2, the maximum frequency of the driving pulse is set to 8 MHz. In the embodiment according to the first driving method, the high-speed transfer unit 36 is used thereby to make the reading speed at the resolutions 600 dpi and 300 dpi higher while suppressing the maximum frequency to a small value.

(Second Driving Method)

Figure 7:
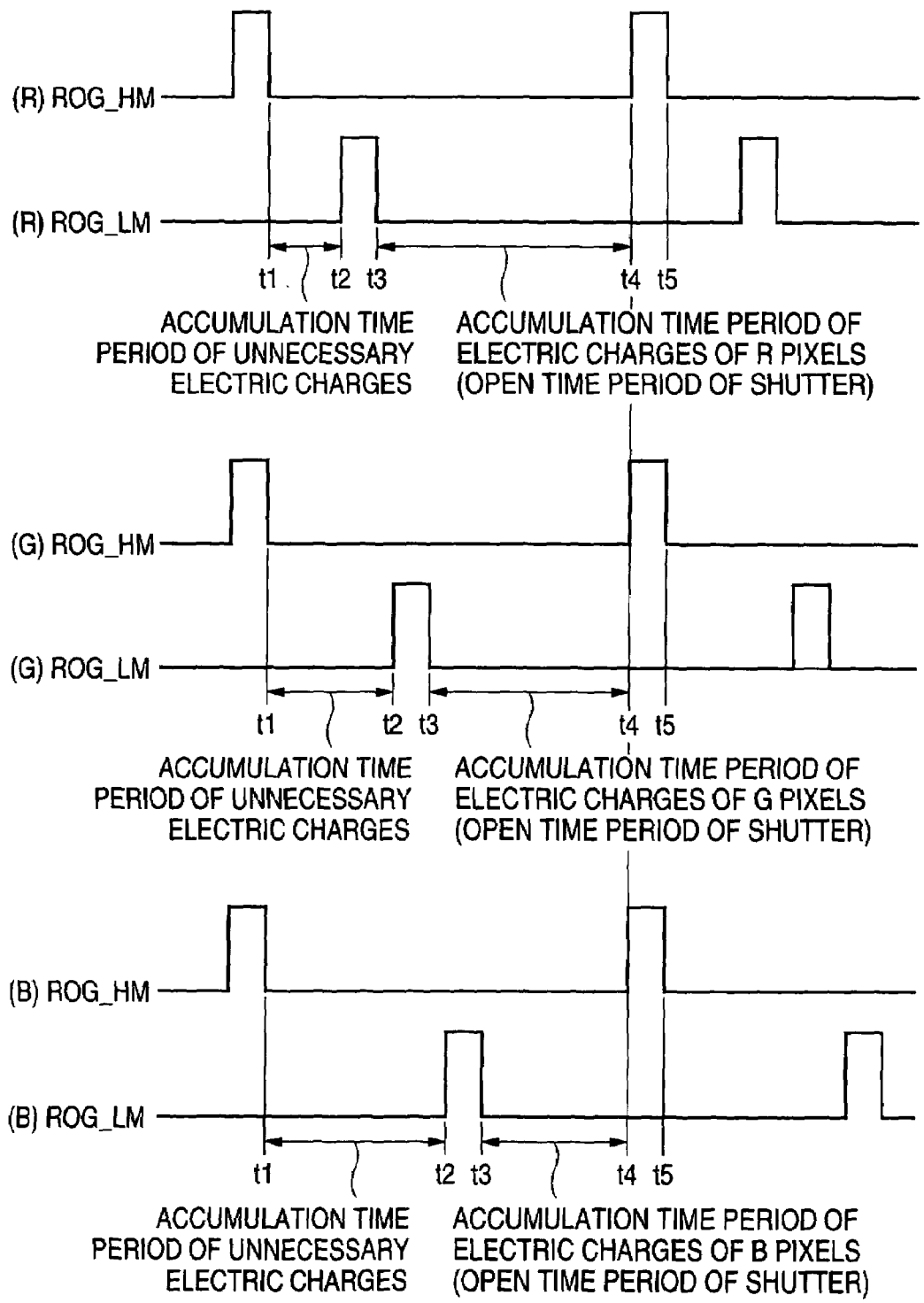
FIG. 7 is a timing charts illustrating a driving method according to the embodiment of the invention.

FIG. 7 shows timing charts illustrating the second driving method of the image sensor 1. In the second driving method, an electric shutter is realized by the pulses ROG_HM and ROG_LM. That is, an interval for accumulating pixel electric charges for each line is shortened by ejecting unnecessary electric charges by using the high-speed transfer unit 36.

To be more concrete, before accumulating pixel electric charges for each of R, G and B in the main photo receiving unit 40, the ROG_LM is applied to transfer unnecessary electric charges from the main photo receiving unit 40 to the high-speed transfer unit 36 (t2<t<t3). The ROG_HM is made high only at a timing (t4<t<t5) of closing the shutter and kept low during a period (t1<t<t4) except for that timing. Thus, pixel electric charges for each of R, G and B are accumulated in the main photo receiving unit 40 during a period (t3<t<t4) until the ROG_HM is applied after the ROG_LM is applied. When the timing for applying the ROG_LM is shifted at every color, an accumulation time of pixel electric charges can be changed for each color. Succeedingly, the pixel electric charges accumulated in the main photo receiving unit 40 are transferred to the main transfer unit 44 by applying the ROG_HM. When all of the electric charges transferred to the main transfer unit 44 are transferred to the detection unit 11, the reading operation of the next line can be started.

As described above, in the next line, since unnecessary electric charges are ejected to the high-speed transfer unit 36 (t2<t<t3), the accumulation of pixel electric charges can be started at the main photo receiving unit 40 without waiting for the completion of the transfer of unnecessary electric charges. Further, the transfer of unnecessary electric charges can be completed with the number of the shift cycles which is one quarter of the number of the shift cycles of the main transfer unit 44. Thus, according to the second driving method, an interval for accumulating pixel electric charges for each line can be shortened. Incidentally, the second driving method can also be applied to the reading mode with the basic resolution using the sub-photo receiving unit 34 and the sub-transfer unit 32. Further, in the case of using the second driving method, a constituent element for ejecting electric charges of the high-speed transfer unit 36 may be added to the image sensor 1 in addition to the detection unit 11.

What is claimed is:

1. An image pickup device comprising:
a photo receiving unit in which a plurality of cells each generating electric charges through photoelectric conversion are arranged in series;
a first transfer unit which is provided in parallel to the photo receiving unit and transfers electric charges generated by the photo receiving unit for each of the plurality of cells;
a first gate which is provided between the photo receiving unit and the first transfer unit and transfers electric charges generated by the photo receiving unit to the first transfer unit;
a second transfer unit which is provided in parallel to the photo receiving unit and transfers electric charges generated by the photo receiving unit for plural cells of the plurality of cells;
a second gate which is provided between the photo receiving unit and the second transfer unit and transfers electric charges generated by the photo receiving unit to the second transfer unit; and
a detection unit which detects electric charges transferred by the first transfer unit, wherein
two of the photo receiving units are arranged in a manner that the plurality of cells of one of the two photo receiving units are deviated by a half pitch in an arrangement direction from the plurality of cells of the other of the two photo receiving units,
the two photo receiving units are disposed in parallel to each other and are provided for each color,
two of the first transfer units are disposed on both outer sides of the two photo receiving units, respectively, and are provided for each color,
two of the first gates are provided in a manner that one of the two first gates is disposed between corresponding one of the two photo receiving units and corresponding one of the two first transfer units and the other of the two first gates is disposed between corresponding the other of the two photo receiving units and corresponding the other of the two first transfer units,
the second transfer unit is disposed on inner sides of the two photo receiving units, and is provided for each color, and
two of the second gates are provided in a manner that one of the two second gates is disposed between corresponding one of the two photo receiving units and the second transfer unit and the other of the two second gates is disposed between corresponding the other of the two photo receiving units and the second transfer unit.

2. An image pickup device according to claim 1, wherein the detection unit detects electric charges transferred by the first and second transfer units.

3. A method of driving a image pickup device which includes: a photo receiving unit in which a plurality of cells each generating electric charges through photoelectric conversion are arranged in series; a first transfer unit which is provided in parallel to the photo receiving unit and transfers electric charges generated by the photo receiving unit for each of the plurality of cells; a first gate which is provided between the photo receiving unit and the first transfer unit and transfers electric charges generated by the photo receiving unit to the first transfer unit; a second transfer unit which is provided in parallel to the photo receiving unit and transfers electric charges generated by the photo receiving unit for plural cells of the plurality of cells; a second gate which is provided between the photo receiving unit and the second transfer unit and transfers electric charges generated by the photo receiving unit to the second transfer unit; and a detection unit which detects electric charges transferred by the first transfer unit, wherein
two of the photo receiving unit are arranged in a manner that the plurality of cells of one of the two photo receiving units are deviated by a half pitch in an arrangement direction from the plurality of cells of the other of the two photo receiving units,
the two photo receiving units are disposed in parallel to each other and are provided for each color,
two of the first transfer unit are disposed on both outer sides of the two photo receiving units, respectively, and are provided for each color,
two of the first gate are provided in a manner that one of the two first gates is disposed between corresponding one of the two photo receiving units and corresponding one of the two first transfer units and the other of the two first gates is disposed between corresponding the other of the two photo receiving units and corresponding the other of the two first transfer units, the second transfer unit is disposed on both inner sides of the two photo receiving units, and is provided for each color, and two of the second gate are provided in a manner that one of the two second gates is disposed between corresponding one of the two photo receiving units and the second transfer unit and the other of the two second gates is disposed between corresponding the other of the two photo receiving units and the second transfer unit, the method comprises the steps of:

in a reading mode with a high resolution, transferring, from the two first transfer units in parallel, electric charges accumulated in the two photo receiving units during an open time period of a shutter; and in a reading mode with a low resolution, joining, at the second transfer unit, electric charges accumulated in the two photo receiving units during the open time period of the shutter and transferring the electric charges thus joined.

4. A method according to claim 3 comprising steps of:

after opening the second gate, closing the first and second gates thereby to open the shutter; and after opening the shutter, opening the first gate thereby to close the shutter.

* * * * *